United States Patent [19]

Mulvany, Jr.

[11] 4,092,390
[45] May 30, 1978

[54] SYSTEM AND METHOD FOR HEATING AND FORMING THERMOPLASTIC MATERIAL

[76] Inventor: R. F. Mulvany, Jr., 803 N. Humboldt, #201, San Mateo, Calif. 94401

[21] Appl. No.: 682,887

[22] Filed: May 3, 1976

Related U.S. Application Data

[63] Continuation-in-part of Ser. No. 335,401, Feb. 23, 1973, abandoned.

[51] Int. Cl.² .............................................. B29C 17/06
[52] U.S. Cl. ...................................... 264/94; 219/405; 219/411; 425/174.4; 432/8; 432/9
[58] Field of Search ....................... 432/9, 10, 31, 175, 432/184, 185, 59, 8; 219/347–349, 400, 405, 411, 412, 413, 377, 339, 343, 358; 425/174.4, 389; 34/4

[56] References Cited

U.S. PATENT DOCUMENTS

| | | | |
|---|---|---|---|
| 2,577,184 | 12/1951 | Dietrich et al. | 219/405 |
| 2,764,664 | 9/1956 | Stewart | 219/411 |
| 2,862,095 | 11/1958 | Scofield | 219/400 |
| 3,193,663 | 7/1965 | Budzich et al. | 219/405 |
| 3,221,416 | 12/1965 | Smith, Jr. | 432/8 |
| 3,552,299 | 1/1971 | Patoka | 219/411 |
| 3,682,643 | 8/1972 | Foster | 219/405 |
| 3,761,550 | 9/1973 | Seefluth | 219/411 |
| 3,814,562 | 6/1974 | Diamond | 425/174.4 |
| 3,984,197 | 10/1976 | Birke et al. | 432/8 |

Primary Examiner—John J. Camby
Assistant Examiner—Henry C. Yuen
Attorney, Agent, or Firm—Townsend and Townsend

[57] ABSTRACT

A system and method for heating thermoplastic material and forming elongated and involute thermoplastic articles from the thermoplastic material is disclosed. Means are provided for controllably heating a sheet of thermoplastic material to form preselected temperature gradients throughout the sheet of thermoplastic material. Means are further provided for planarly supporting the heated sheet of thermoplastic material allowing for transverse motion of the heated sheet of thermoplastic material at the center thereof and further allowing for controlled slippage of the heated sheet of thermoplastic material toward said center thereof relative to the planar support means. Means are also provided for transversely forming a heated sheet of thermoplastic material into the shape of an elongated or involute plastic article.

7 Claims, 8 Drawing Figures

U. S. Patent May 30, 1978 Sheet 1 of 3 4,092,390
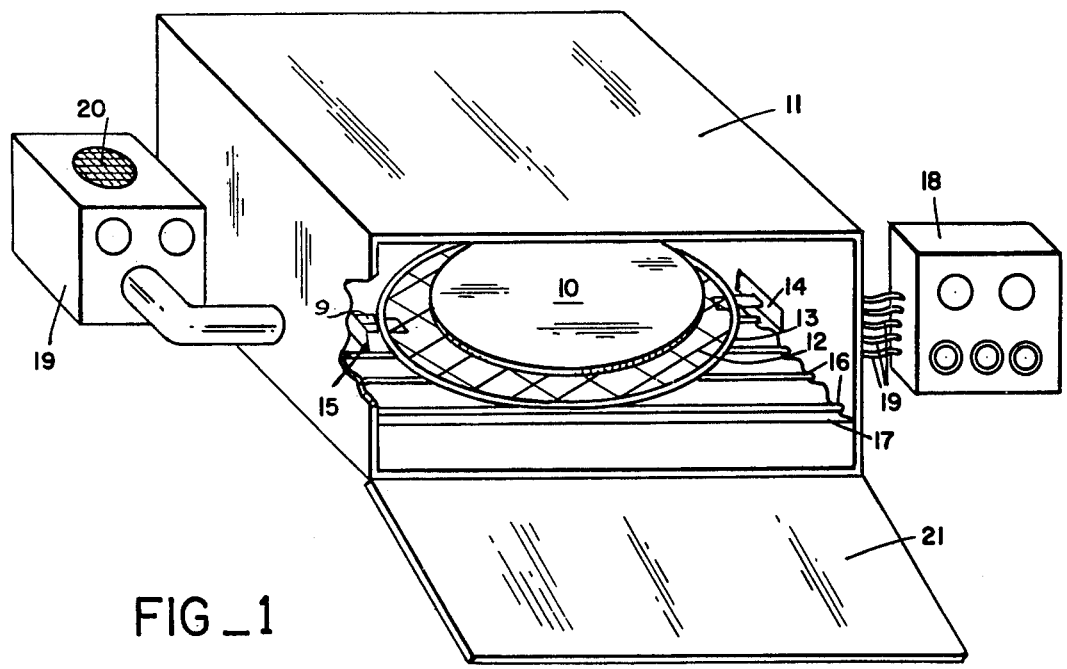
FIG_1
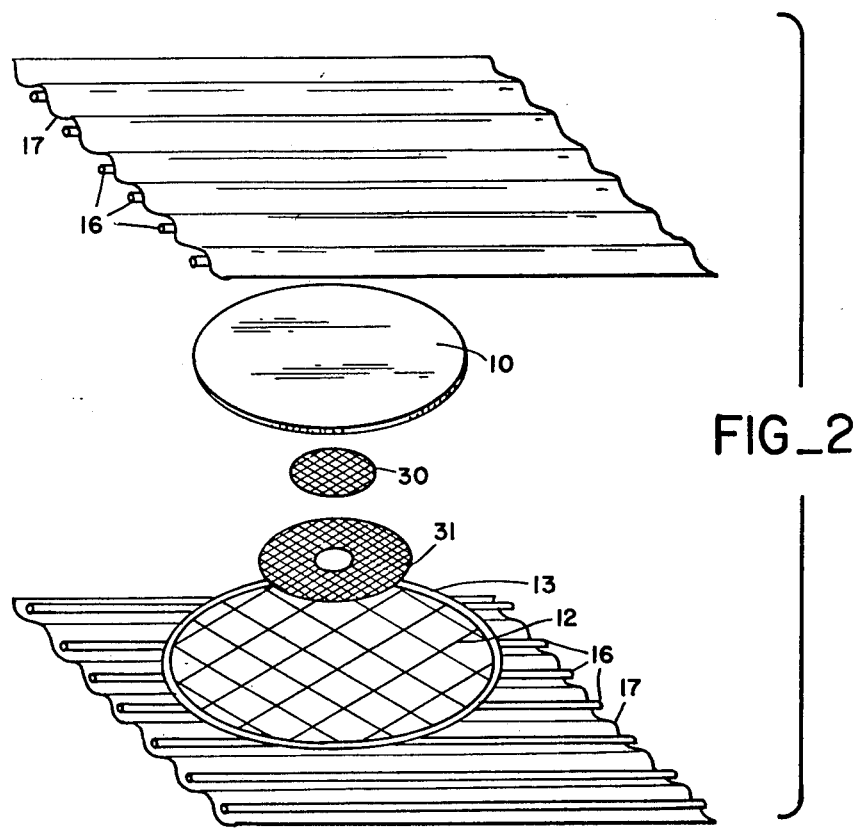
FIG_2

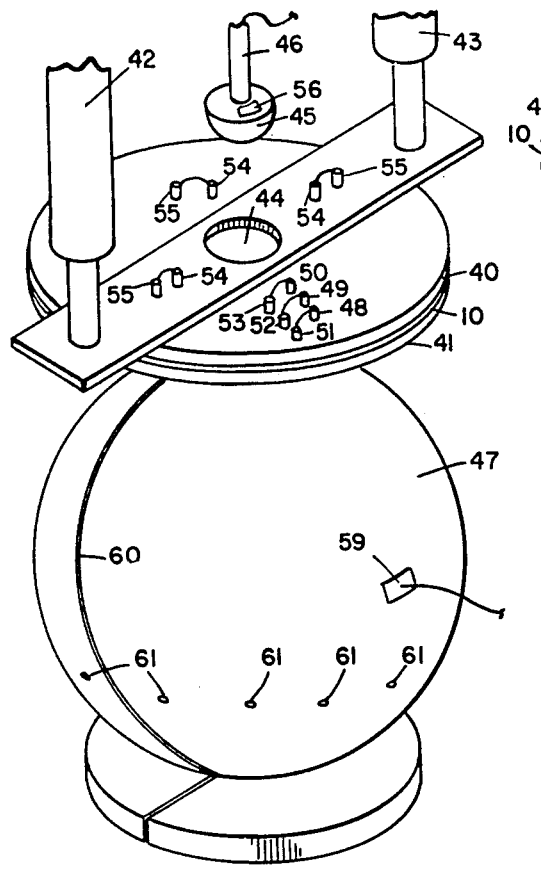
FIG_3
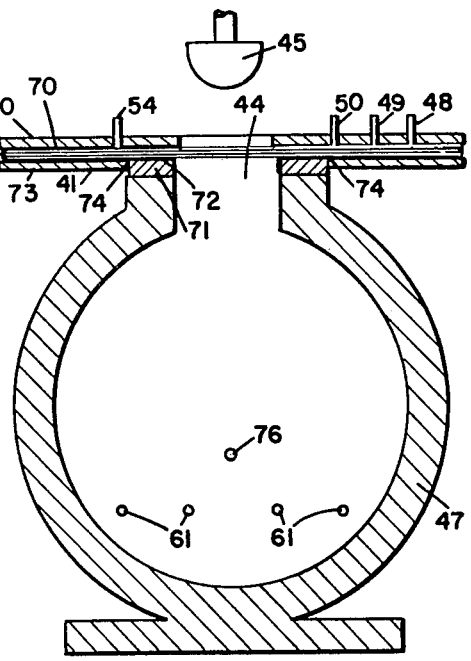
FIG_4
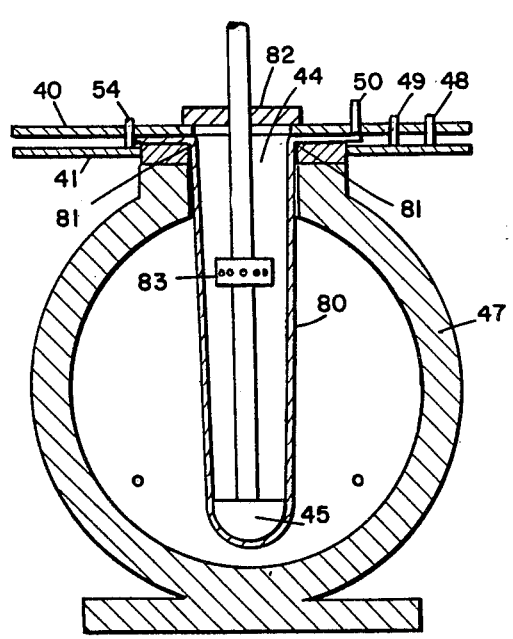
FIG_5
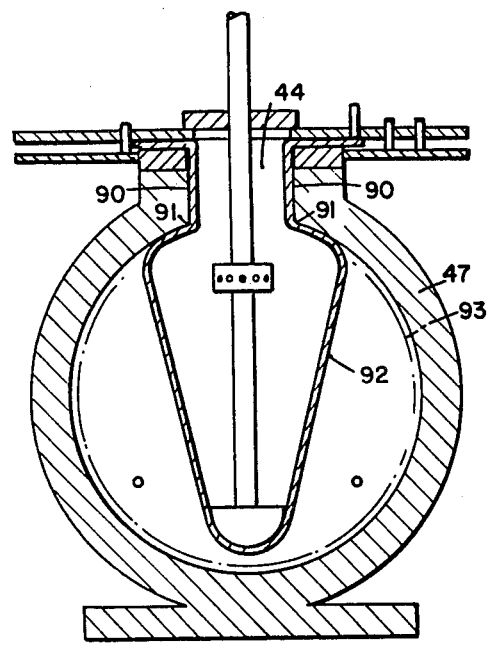
FIG_6

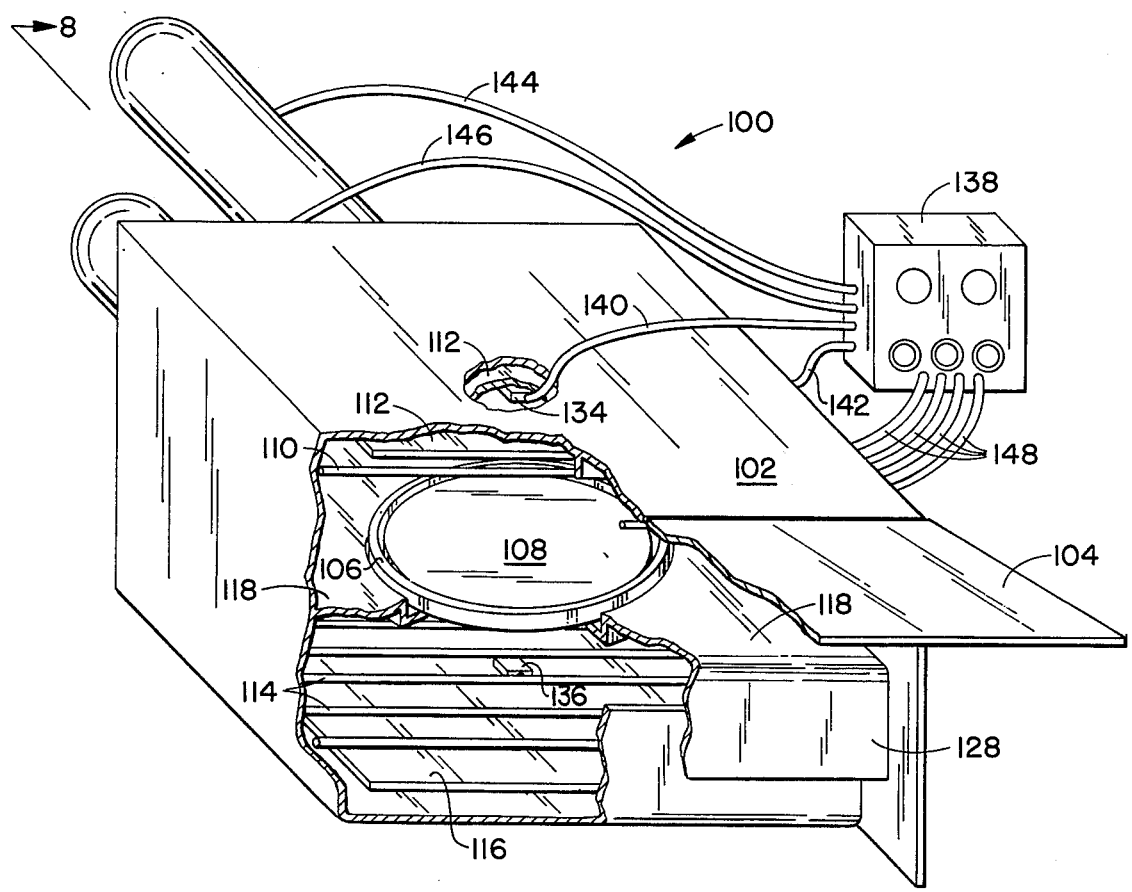
FIG _ 7
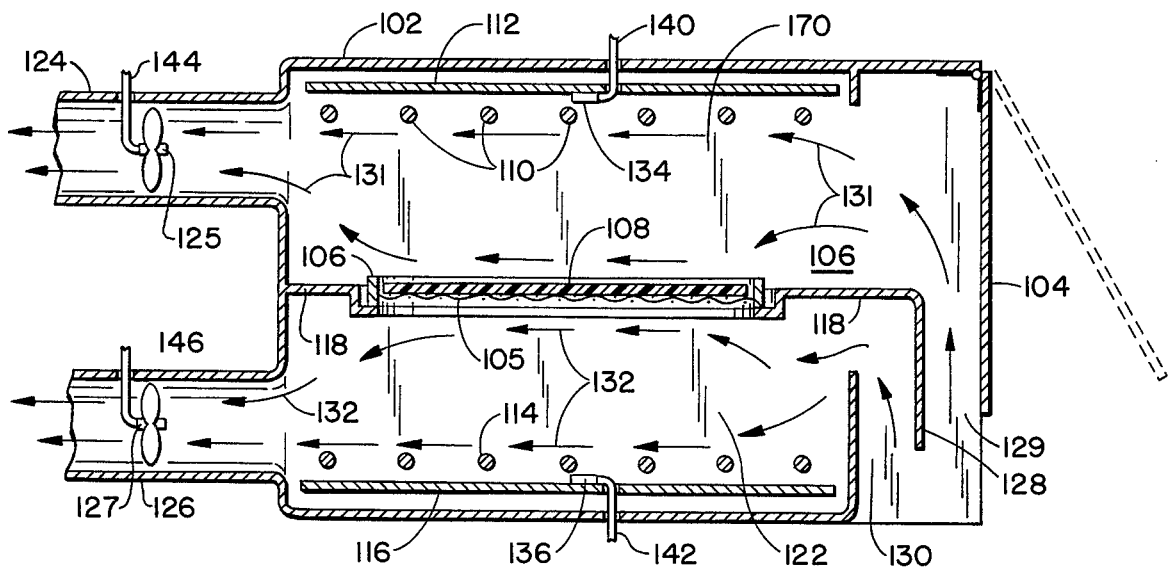
FIG _ 8

SYSTEM AND METHOD FOR HEATING AND FORMING THERMOPLASTIC MATERIAL

This application is a continuation-in-part of my previous application for SYSTEM AND METHOD FOR FORMING PLASTIC ARTICLES, Filed Feb. 23, 1973, Ser. No. 335,401, now abandoned.

BACKGROUND OF THE INVENTION

Field of the Invention

The invention relates to a system and method for heating thermoplastic materials and forming involute or elongate plastic articles from the heated thermoplastic material.

Description of the Prior Art

Current methods of heating and forming thermoplastic material have certain basic deficiencies which restrict their utility particularly in forming involute or elongate articles. Involute plastic structures, i.e., structures having a neck smaller than an interior cross-section, are generally formed by bonding two or more separately formed pieces of material together, rather than forming the article from a single piece, and the seam or joint required degrades the optical properties of the article. Injection blow molding can be used to form thermoplastic articles, but this method is limited to relatively small articles due to the magnitude of the equipment involved. Extrusion blow molding can also be used to form thermoplastic articles, but the closure on the end opposite the opening forms objectionable marks and loss of optical properties.

The present invention discloses a system and method for heating thermoplastic material and forming elongated involute articles from the heated thermoplastic material having a variety of novel and innovative features which overcome deficiencies in the methods used to date.

The invention provides a methodology for accurately and rapidly heating thermoplastic material using infrared heating to facilitate subsequent formation thereof. After the sheet of thermoplastic material is heated, it is placed in a device for forming the thermoplastic material to the desired shape. The heated sheet of thermoplastic material ia planarly supported by the device and held in accurately monitored compression to control slippage of the material toward the center thereof. A plug is used to project the center of the sheet of thermoplastic material through an aperture in the planar support, and the material "self-forms" around a sharp corner on the interior of the aperture into an elongated shape. The planar support disclosed herein also provides a means for inducing axial stress in the sheet of material to control the thickness of the thermoplastic material as it is formed from the flat sheet into the elongated piece.

In the formation of involute articles, the elongated piece is formed within an involute female mold. The involute female mold disclosed herein has a flat aperture section forming the entrance to the mold and a sharp corner is provided at the junction of the flat aperture section and the interior surface of the female mold to eliminate potential formation of stress cracks. The ambient environment of the thermoplastic material as it is elongated is closely controlled to prevent cooling of the material below its forming temperature so that it can be expanded within the mold by injection of pressurized air into the interior cavity of the elongate piece. As the material expands, the concentric temperature zones control relative expansion of the different areas of the material so that the final article has controlled and approximately uniform wall thickness.

SUMMARY OF THE INVENTION

The invention provides an infrared oven with voltage and ambient temperature controls to rapidly and accurately heat a sheet of thermoplastic material. In the preferred form of the heating methodology of the present invention, thermoplastic material is placed in an oven between opposing arrays of infrared heating elements. Each array of heating elements includes a reflector to direct the radiation from the heating elements at the thermoplastic material. The input voltage to the infrared heating element is controlled during heating of the material. In addition, the temperature of the reflectors is controlled, generally by controlling the ambient temperature within the oven and the flow of air through the oven. Since heat tends to rise and the upper portion of the oven may be a greater temperature than the lower portion, it has been found desirable to divide the oven into upper and lower sections, one array of heating elements and its reflectors being located in each section. The temperatures of the reflectors in each section can be controlled through control over the ambient temperature within the oven in each section.

It appears that when the thermoplastic material is heated as disclosed hereinabove, the center of the material is heated to a higher temperature than the surfaces thereof. This may result from both the fact that the material is heated by infrared radiation, and that the reflector temperature and the ambient temperature within the oven are controlled by drawing relatively cooler air into the oven. In any event, the surfaces of the material do not become sticky when heated as described hereinabove, in contrast to heating techniques known in the prior art, so that the material can be formed without surface defects and other optical flaws. Also, the hotter center of the material tends to minimize heat losses during subsequent formation of the material so that more forming time is available.

During the heating of the thermoplastic material, metallic screens may be interposed between the oven heating elements and the thermoplastic material to establish radial temperature gradients in the material. After the sheet of thermoplastic material has been heated, it is placed between a pair of opposed platens which provide planar support. The pair of opposed platens have apertures through the centers thereof to allow for transverse extension of the thermoplastic material and allow for controlled slippage of the thermoplastic material toward the center thereof. A heated plug is used to transversely extend the thermoplastic material into an elongated conical piece. During the elongation process, the thermoplastic material "self-forms" as it translates from between the pair of opposed platens into the elongated shape, and a small radius corner must be provided at this junction to properly allow the material to self-form.

If involute articles are to be formed, the elongate conical shaped piece is formed within an involute female mold, and compressed air is injected into the interior cavity of the elongated conical shaped piece to expand and press the thermoplastic material against the surface of the mold. Proper design of the entrance of the involute female mold and proper maintenance of the temperature gradients in the thermoplastic material, particularly the cooler surfaces of the heated material, allow for the formation of an involute article virtually without optical defects.

The novel features which are believed to be characteristic of the invention, both as to organization and method of operation, together with further objects and advantages thereof will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

BRIEF DESCRIPTION OF THE DRAWINGS

FIG. 1 is a perspective view of the apparatus used for heating the thermoplastic material.

FIG. 2 is an exploded view of the interior of the heating apparatus.

FIG. 3 is a perspective view of the apparatus used to form the elongate involute plastic articles.

FIG. 4 is a cross-sectional elevation view of the apparatus illustrated in FIG. 3 showing the sheet of thermoplastic material in position to be formed.

FIG. 5 is the cross-sectional elevation view of FIG. 4 after the sheet of thermoplastic material has been formed into an elongate conical shaped piece.

FIG. 6 is the cross-sectional elevation view illustrated in FIGS. 4 and 5 after the elongated conical shaped piece of thermoplastic material has been partially formed into an involute plastic article.

FIG. 7 is a perspective, partially cut-away view of a second embodiment of the apparatus used for heating the thermoplastic material.

FIG. 8 is a sectional view taken along lines 8—8 of FIG. 7.

DESCRIPTION OF THE PREFERRED EMBODIMENTS

Referring to FIG. 1, a circular sheet of thermoplastic material 10 is mounted inside an oven enclosure 11. The circular sheet of thermoplastic material 10 is supported on a grid 12 of very fine, widely-spaced wires which are attached to a rotatable ring 13. The rotatable ring 13 is mounted on brackets 14 and 15 attached to the side of the oven enclosure 11, and is rotated by motor 9. In this manner, contact of the mounting structure with the sheet of thermoplastic material is minimized, and only the thin wires are interposed between the thermoplastic material and the heating mechanism.

The sheet of thermoplastic material 10 is heated by means of linear infrared heating elements 16. An array of heating elements is disposed adjacent both the top and the bottom faces of the thermoplastic material 10, but the upper array is hidden in the perspective view of FIG. 1. A scalloped reflecting structure 17 is used to direct the radiant heat from the infrared heating elements 16 in the direction of the thermoplastic material 10. Potential heating irregularities due to the linear nature of the array are compensated for by rotating the sheet of thermoplastic so that the heating is concentrically uniform.

In the present invention, it is highly desirable that the heating of the sheet of thermoplastic material 10 be accurately and precisely controlled, since only slight deviations from the desired heating may degrade the integrity of the entire forming process. Hence, a voltage regulator 18 is used to provide a precisely controlled and constant input voltage to the linear infrared heating elements 16 through leads 19. However, the heat loss of gain of the sheet of thermoplastic material 10 and the radiant output of the heating elements 16 is dependent on the ambient air temperature within the oven enclosure 11 and the temperature of reflectors 17. Therefore, besides controlling the input voltage to the heating element 16 in order to accurately control the heating of the sheet of thermoplastic material 10, it is also desirable to control the ambient air temperature within the oven (and/or reflector temperature, as discussed hereinafter).

Oven temperature control is provided by a venting mechanism which exhausts heated air out vent 20. The venting mechanism 19 controls the venting of air and maintains the ambient temperature of the air inside the oven enclosure 11 at a constant temperature. The door 21 to the oven enclosure 11 does not fully seal off the enclosure, but rather provides for a slight intake of air to compensate for the heated air vented through the exhaust vent 20. By accurately and precisely controlling the radiant heating of the sheet of thermoplastic material 10, the process becomes very repeatable and provides constant quality control of the end product.

The heating control described above results in relatively cool air being drawn over the surfaces of the material 10 so that the material is in a relatively cool environment. The infrared radiation from elements 16 penetrates the material surface and directly heats the interior of the material, in contrast to conventional non-infrared heating when the center of a piece of material is heated by conduction from the hotter surface. The heating technology of the present invention appears to heat the center of material 10 to a higher temperature than the surfaces thereof. As a result, material 10 is heated sufficiently so that it can be readily formed, but the surfaces do not become sticky. When material 10 is then formed, the relatively cool surfaces of the material are not scarred or marked by the forming equipment and surface blemishes and other optical defects are not introduced in the material.

To control subsequent formation of the material, not only should the general heating of the sheet of thermoplastic material 10 be controlled, but it may also be desirable to set up various temperature gradients throughout the thermoplastic material. FIG. 2 is an exploded view illustrating the sheet of thermoplastic material 10 separated from its support grid 12 of thin, widely spaced wires attached to ring 13. Both the upper and lower arrays of linear infrared heating elements 15 with their scalloped reflecting structures 17 are illustrated. The mechanism for mounting and rotating the ring 13 is not illustrated in FIG. 2. To establish radial temperature gradients in the sheet of thermoplastic material 10, concentric rings of metallic screen 30 and 31 are interposed between the sheet of thermoplastic material 10 and the support grid 12. Although shown separately in the exploded view, in actual operation they are positioned one on top of the other. In the Figure, two concentric rings of metallic screen are illustrated for simplicity, but in practice a multitude of concentric rings of metallic screen are normally utilized, with some rings having internal cutout sections as in concentric ring 31 and some without such cutouts as in concentric ring 30. The purpose of the concentric rings of metallic screen is to block a portion of the radiant energy from the infrared heating elements 16 to prevent it from reaching the sheet of thermoplastic material 10.

Since the metallic screen is formed in concentric rings a set of radial temperature gradients will be established.

The heating apparatus as described above is designed to heat the sheet of thermoplastic material 10 such that the edge of the sheet is heated to a greater extent than the central area of the sheet. Concentric heat zones are formed by the metallic screens so that the center is heated to a temperature near the low end of the forming temperature range, the edge is heated to a temperature near the high end of the forming temperature range, with possible intermediate zones between the center and the edge.

After the sheet of thermoplastic material 10 is heated, it is immediately transferred to the forming apparatus illustrated in FIG. 1 and placed between a pair of opposed platens consisting of an upper platen 40 and a lower platen 41. The upper platen 40 is attached to air actuators 42 and 43 which control the compression that the pair of opposed platens 40 and 41 maintain on the heated sheet of thermoplastic material 10. An aperture 44 is formed through the upper platen 40 and the lower platen 41 whereby the center of the heated sheet of thermoplastic material 10 is exposed. A plug 45 mounted on shaft 46 is passable through the aperture 44 through the pair of opposed platens 40 and 41 to form the heated sheet of thermoplastic material into an elongated conical shaped piece. The elongated conical shaped piece is formed within an involute female mold 47 if involute articles are to be produced. If merely elongated conical articles are to be produced, the involute female mold 47 is not necessary.

During the formation of the elongated conical shaped piece of thermoplastic material, it is desirable to gradually increase the compression of the pair of opposed platens 40 and 41 on the sheet of thermoplastic material to prevent flange wrinkling and to control slippage of the thermoplastic material relative to the pair of opposed platens. The preferred method of controlling the increase in compression is by means of a closed loop control system wherein the pressure exerted by air actuators 42 and 43 is increased based on the amount of thermoplastic material which has been used in the forming process. To provide such a closed loop system, a row of thermoinsulative pegs 48, 49 and 50 is provided which are placed in a row of radially disposed holes on the upper platen 40. As the edge of the sheet of thermoplastic material 10 moves in the direction of the aperture 44 during the formation process, switches 51, 52 and 53 attached to the pegs 48, 49 and 50 are successively actuated by the falling of the pegs through the holes to monitor the movement of the thermoplastic material toward the aperture. The switches successively increase the pressure exerted by air actuators 42 and 43 whereby the compression exerted by the pair of opposed platens 40 and 41 is gradually increased.

A plurality of pegs 54 are located in a ring of holes in the upper platen 40 disposed about the aperture 44. Switches 55 are connected to the pegs 54, and the interior peg 50 and connecting switch 53 of the radically disposed row of pegs form part of the ring. The ring of pegs is adapted to cause the air actuators 42 and 43 to exert sufficient pressure to clamp the heated sheet of thermoplastic material 10 between the pair of opposed platens 40 and 41 to prevent any slippage of the thermoplastic material relative to the opposed platens. Any one of the ring of pegs 54 and 50 will activate the clamping procedure so that no part of the edge of the sheet of thermoplastic material 10 can enter the aperture 44.

In order to control the temperature of the sheet of thermoplastic material 10 at all times, parts of the apparatus which come into direct contact with the thermoplastic material are heated. A heater 56 is attached to the plug 54, and a heater 59 is also attached to the involute female mold 47. Portions of the apparatus which are actively heated, i.e., the plug 45 and the mold 47, are constructed of thermoconductive material to evenly distribute the heat throughout the structure.

The involute female mold 47 can be split along seam 60 so that it can be divided into sections. Air holes 61 are provided to allow for exhaust of air from the interior of the mold 47 during the forming process.

The actual formation of the involute plastic articles can be more fully illustrated by viewing FIGS. 4, 5, and 6 in series. FIG. 4 illustrates the heated sheet of thermoplastic material 10 in position between the upper platen 40 and the lower platen 41. The plug 45 is in the raised position above the aperture 44 through the pair of opposed platens 40 and 41. Pegs 48, 49, 50 and 54 are in abutment with the sheet of thermoplastic material 10 and are thus maintained in position.

The upper platen 40 is composed of thermoconductive material, but has a coating of thermoinsulative material 70 on the face adapted to contact the heated sheet of thermoplastic material 10. The lower platen 41 is composed of an interior annular section 71 of thermoconductive material which is coated by a layer of thermoinsulative material 72 on the faces of the lower platen adapted to contact the heated sheet of thermoplastic material 10. Teflon is preferably used as the thermoinsulative material since it facilitates slippage of the thermoplastic material relative to the platens. The exterior section of the lower platen 41 is mounted circumferentially about the periphery of the interior annular section 71, and is preferably composed of semi-rigid thermoinsulative material such as wood. The exterior section 73 is slightly depressed relative to the interior section 71 such that a slight lip 74 is formed on the surface of the lower platen 41 at the junction between the interior section 71 and the exterior section 73. The slight lip 74 allows control of slippage through pressure without compressing the entire sheet of thermoplastic material.

If involute plastic articles are to be formed, the interior section 71 of the lower platen 41 is preferably attached directly to an involute female mold 47 such that the aperture 44 through the lower platen 41 forms the entrance opening to the female mold. The involute female mold illustrated in FIG. 4 is basically spherical, but the methodology illustrated herein is applicable to any shape wherein the neck of the article is smaller than an interior cross-section, i.e., wherein the article is involute, as well as to tapered, i.e., non-involute articles. The mold 47 has holes 61 therein adapted to allow for exit of air from the interior of the mold during formation of the articles. In addition, a sensor 76 is mounted on the interior surface of the involute female mold 47 and is adapted to sense contact of the thermoplastic material with the interior surface of the involute female mold to indicate that the formation of the article is completed.

Formation of the elongated conical shaped piece is illustrated by way of reference to FIG. 5. The outer diameter of the plug 45 with the thermoplastic material thereon is smaller than the interior diameter of the aperture 44 so that the thermoplastic material is not compressed between the plug and the walls of the aperture. Hence, the thermoplastic material "self-forms" as it translates from between the pair of opposed platens 40 and 41 into the aperture 44. Due to the self-forming nature of the process, the construction of the corner 81 over which the elongated conical shaped piece 80 self-forms is significant. Normal molding technology would dictate that a large radius corner be used to alleviate friction. However, one of the principal features of the preferred embodiment of the present invention disclosed herein is that a relatively sharp, small radius corner as illustrated is far preferable to a large radius corner.

In the formation of the elongated conical shaped piece 80, the thermoplastic material is drawn radially inwardly toward the aperture 44 as the plug 45 extends the material. As the edge of the heated sheet of thermoplastic material is drawn toward the aperture, the thermoinsulative pegs 48 and 49 successively fall whereby the compression exerted by the pair of opposed platens 40 and 41 on the thermoplastic material is increased. When the edge of the thermoplastic material is sufficiently close to the aperture so that one of the pegs 54 or 50 in the interior ring falls, sufficient compression is exerted by the pair of opposed platens to clamp the thermoplastic material in place between the platens.

The plug 45 extends to such a depth that the tip of the elongated conical shaped piece 80 is substantially adjacent the interior surface of the involute female mold 47 opposite the entrance opening 44. A lid 82 is mounted on the shaft 46 which holds the plug 45 and is adapted to fit over the aperture through the upper platen 40 whereby the interior cavity of the elongated conical shaped piece 80 is sealed. Hence, pressurized air can be introduced through nozzle 83 also located on shaft 46 in order to form the desired involute plastic article. The sequence of operations illustrated by FIGS. 4 and 5 are performed in a relatively short amount of time so as to prevent substantial cooling of the thermoplastic material. Hence, the elongated conical shaped piece 80 basically retains the temperature configuration imparted to it during the heating process.

As air is injected into the interior cavity of the elongated conical shaped piece, the walls of thermoplastic material do not expand simultaneously, but the formation of the article proceeds in various steps. The initial step in the formation of the involute plastic article is illustrated in FIG. 6. The first formation takes place in the area of the entrance to the involute female mold 47 as illustrated by contour 92. Since the original temperature zones established in the heating process has been maintained, thermoplastic material which was near the edge of the original sheet of thermoplastic material is at a greater temperature than material intermediate the edge and the center. The thermoplastic material which was adjacent the edge of the original sheet of thermoplastic material is now adjacent the entrance opening 44 of the involute female mold 47, and due to its greater temperature forms first. The thermoplastic material in the region of the entrance 44 to the involute female mold 47 comes into contact with the entrance opening and the interior surface of the female mold adjacent the entrance opening as air is first injected into the cavity. Although the involute female mold is heated, it is heated to a lesser temperature than the thermoplastic material, so that the thermoplastic material is cooled rapidly by the relative temperature differential when it comes in contact with the thermoconductive surface of the mold. Hence, the shape of the junction between the flat surface 90 and the interior surface of the female mold 47 is significant. The invention provides for a small radius corner 91 at this junction, rather than a large radius corner as would be expected, together with a vertical surface 90 of thermoconductive material at the entrance to the mold. As compressed air is introduced through nozzle 83, the hot plastic first contacts the vertical surface 90 and immediately cools. This prevents further slippage and eliminates stress cracking during the balance of the forming process.

It is apparent from FIG. 6 that the initial expansion, which took place near the entrance opening 44, is in a region wherein the material has only a short distance to travel before reaching the interior surface of the mold 47. Hence, the portion of thermoplastic material which is heated more than other portions has the shortest distance to travel to reach the interior surface of the mold. The thermoplastic material which was less heated has a relatively long distance to travel before it reaches the interior surface of the mold 47 in its final form as illustrated by the dashed contour 93. In this manner, the material which has the shortest distance to go stretches most rapidly, and the end result is the formation of an involute thermoplastic article with controlled wall thickness.

It has been found that a certain amount of variation in the heating of the plastic material still occurred when the apparatus of FIGS. 1 and 2 hereof was used. Accordingly, an improved heating apparatus 100 has been developed, as illustrated in FIGS. 7 and 8.

Apparatus 100 includes an oven enclosure 102 provided with a door 104. A rack 106 supporting a wire grid 105 is mounted within oven enclosure 102 to support thermoplastic material 108. Rack 106 is axially rotatable so that thermoplastic material 108 is heated in a concentrically uniform manner, as in the previous embodiment of the heating apparatus.

An array of linear infrared heating elements 110 is disposed along the upper surface of oven enclosure 102. A reflector 112, typically a flat aluminum sheet, is located above the array of heating elements 110 to direct the infrared radiation from the heating elements toward thermoplastic material 108. A corresponding array of linear infrared heating elements 114 is disposed along the bottom of oven enclosure 102. A reflector 116 is located along the bottom of oven enclosure 102 to direct the infrared radiation from the heating elements 114 at thermoplastic material 108. Accordingly, thermoplastic material 108 is heated from both sides using infrared radiation.

Oven enclosure 102 is provided with a divider 118 which divides the interior of the oven enclosure into an upper section 120 and a lower section 122. Upper section 120 includes the upper array of infrared heating elements 110 and its associated reflector 112. Correspondingly, lower section 122 includes the lower array of infrared heating elements 114 and its reflector 116.

A conduit 124 extends from oven enclosure 102 and is in communication with upper section 120. A similar conduit 126 is in communication with lower section 122. Oven door 104 does not close completely, and divider 118 has a downwardly projecting lip 128 so that a pair of entrance openings 129, 130 are provided to sections 120, 122 of oven enclosure 102 respectively. Conduit 124 is provided with a fan 125 and conduit 126 has a fan 127. Using fans 125, 126, ambient air can be drawn independently into each section 120, 122 of oven enclosure 102. The ambient air drawn through enclosure 102 passes over thermoplastic material 108, and is vented from the oven enclosure through conduits 124, 126 and illustrated by arrows 131, 132 respectively.

Each reflector element 112, 116 is provided with a temperature sensing element 134, 136 respectively. Temperature sensing elements 134, 136 are connected to a control unit 138 by leads 140, 142 respectively. Control unit 138 also includes means for controlling fans 125, 127 through leads 144, 146 respectively.

As thermoplastic material 108 is being heated, the power to infrared heating elements 110, 114 is provided through leads 148 from control unit 138. The input voltage to infrared elements 110, 114 is normally maintained constant by control unit 138. Simultaneously, the temperature of reflectors 112, 116 is monitored by temperature sensing elements 134, 136. Control unit 138 controls fans 125, 127 responsively to the temperature of reflectors 112, 116 to maintain control over the heating of thermoplastic material 108. Ordinarily, reflectors 112, 116 are maintained at a substantially constant temperature, preferably the approximate minimum forming temperature of material 108.

By maintaining control over the temperature of reflectors 112, 116 as described herein, it has been found that thermoplastic material 108 can be rapidly heated in a substantially uniform and repeatable manner so that the heated material can be formed as desired. In addition, as with the previous embodiment, the heating system of the present invention appears to heat the surfaces of thermoplastic material 108 to a lesser temperature than the interior so that the material can be more readily formed without optical defects as described hereinabove. The material so heated can be used in conjunction with the forming apparatus of FIGS. 3-6 hereof to form involute plastic articles, or with other types of plastic forming apparatus.

While preferred embodiments of the present invention have been illustrated in detail, it is apparent that modifications and adaptations of those embodiments will occur to those skilled in the art. However, it is to be expressly understood that such modifications and adaptations are within the spirit and scope of the present invention, as set forth in the following claims.

What is claimed is:

1. A method of heating thermoplastic material to allow for subsequent forming of said material, said method comprising the steps of placing the thermoplastic material in an oven between opposing arrays of infrared heating elements each having reflector means located behind the respective heating elements relative to the thermoplastic material to reflect radiation from each said array toward the thermoplastic material, heating the thermoplastic material with the infrared heating elements, sensing the temperature of said reflector means, and controlling the temperature of said reflector means by simultaneously drawing air from outside the oven into the oven, venting heated air from the oven, and controlling said venting to maintain the reflector means at a substantially constant temperature to control the heating of said thermoplastic material.

2. A method as recited in claim 1 wherein the thermoplastic material comprises a sheet of said material and additionally comprising the step of rotating the sheet of thermoplastic material within said oven during said heating to heat said sheet of thermoplastic material in a concentrically uniform manner.

3. A method as recited in claim 1 wherein the thermoplastic material comprises a sheet of said material and additionally comprising the steps of planarly supporting the heated sheet of thermoplastic material so as to permit transverse movement of the center of said heated sheet of thermoplastic material radially inwardly towards the center thereof, transversely extending the center of the heated sheet of thermoplastic material into the interior of an involute female mold to form such sheet into an elongated conical shape piece, and pressurizing the interior cavity of the elongate conical sheet of thermoplastic material without substantially reheating said material to expand and press the thermoplastic material against the interior surface of the involute female mold.

4. A method as recited in claim 2 and additionally comprising the step of dividing the oven into two sections, each said section including a respective array of heating elements and its associated reflector means, and wherein said controlling the temperature of said reflector means includes simultaneously controlling the temperature of each said reflector means independently to control the heating of said thermoplastic material in each said section.

5. A method as recited in claim 1 wherein said controlling step comprises controlling the temperature of said reflector means so that said temperature is approximately equal to the minimum forming temperature of said material.

6. A method of heating thermoplastic material to allow for subsequent forming of said material, said method comprising the steps of placing the thermoplastic material in an oven between opposing arrays of infrared heating elements each having reflector means located behind the respective heating elements relative to the thermoplastic material to reflect radiation from each array toward the thermoplastic material, dividing the oven into two sections on respective sides of the thermoplastic material so that the thermoplastic material is exposed to both said sections, each section including a respective array of heating elements and its associated reflector means, heating the thermoplastic material by irradiating said material by both the infrared heating elements in combination, independently sensing the temperature of each said reflector means, and controlling the temperature of the reflector means in each said section by simultaneously drawing air from outside the oven into each section of the oven, venting heated air from each section of the oven, and controlling said venting from each said section responsively to the temperature of the reflector means in said sections to maintain the respective reflector means at a substantially constant temperature to control the heating of said thermoplastic material.

7. A method as recited in claim 6 wherein said controlling step comprises controlling the temperature of said reflector means in each said section so that said temperature is approximately equal to the minimum forming temperature of said material.

* * * * *